(12) United States Patent
Takeda et al.

(10) Patent No.: US 11,700,613 B2
(45) Date of Patent: *Jul. 11, 2023

(54) METHOD AND DEVICE FOR APPLYING A PUSCH CONFIGURATION TO A RETRANSMISSION

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/058,916

(22) PCT Filed: Jun. 1, 2018

(86) PCT No.: PCT/JP2018/021288
§ 371 (c)(1),
(2) Date: Nov. 25, 2020

(87) PCT Pub. No.: WO2019/230002
PCT Pub. Date: Dec. 5, 2019

(65) Prior Publication Data
US 2021/0219271 A1 Jul. 15, 2021

(51) Int. Cl.
*H04W 72/04* (2009.01)
*H04W 72/23* (2023.01)
(Continued)

(52) U.S. Cl.
CPC ........... *H04W 72/23* (2023.01); *H04L 1/1607* (2013.01); *H04W 52/08* (2013.01)

(58) Field of Classification Search
CPC . H04W 72/14; H04W 52/08; H04W 72/1257; H04W 72/1268; H04W 72/042;
(Continued)

(56) References Cited

U.S. PATENT DOCUMENTS

| 2013/0294242 A1* | 11/2013 | Zhao | H04W 72/1252 |
| | | | 370/235 |
| 2014/0050186 A1* | 2/2014 | Kim | H04W 56/0045 |
| | | | 370/329 |

(Continued)

FOREIGN PATENT DOCUMENTS

EP 3729862 A1 10/2020

OTHER PUBLICATIONS

International Search Report issued in Application No. PCT/JP2018/021288, dated Jul. 24, 2018 (5 pages).
(Continued)

*Primary Examiner* — Afshawn M Towfighi
(74) *Attorney, Agent, or Firm* — Osha Bergman Watanabe & Burton LLP

(57) ABSTRACT

A user terminal includes a receiving section configured to receive first downlink control information for activation of a first channel following periodicity configured by a higher layer and receive second downlink control information for scheduling retransmission of the first channel, and a control section configured to apply a given parameter among first configuration information indicating a configuration for the first channel, second configuration information indicating a configuration for a second channel with periodicity not configured by a higher layer, and the second downlink control information, to the retransmission.

5 Claims, 10 Drawing Sheets

DCI FORMAT 0_0

| DCI BIT FIELD | SIZE (BIT) |
|---|---|
| Identifier for DCI formats | 1 |
| Frequency domain resource assignment | Variable; BWP & RA type config. dependent (depend on DCI size budget) |
| Time domain resource assignment | 0, 1, 2, 3, or 4; pusch-AllocationList dependent (per UL BWP) |
| Frequency hopping flag | 0, or 1; RA type config. dependent & only applicable to RA type 1 (per UL BWP) |
| Modulation and coding scheme | 5; mcs-Table or mcs-TableTransformPrecoder dependent (per UL BWP) |
| New data indicator | 1 |
| Redundancy version | 2 |
| HARQ process number | 4 (fixed at 16 HARQ processes) |
| TPC command for scheduled PUSCH | 2; pusch-PowerControl dependent (per UL BWP) |
| UL/SUL indicator | 0/1 bit |

(51) Int. Cl.
*H04L 1/1607* (2023.01)
*H04W 52/08* (2009.01)

(58) Field of Classification Search
CPC ..... H04L 1/0003; H04L 1/1819; H04L 5/005; H04L 1/189; H04L 1/1893; H04L 5/0053; H04L 1/1864; H04L 1/1822; H04L 1/1887

See application file for complete search history.

(56) References Cited

U.S. PATENT DOCUMENTS

| | | | |
|---|---|---|---|
| 2014/0112263 A1* | 4/2014 | Lee | H04W 72/0446 370/329 |
| 2015/0373739 A1* | 12/2015 | Seo | H04L 5/0053 370/329 |
| 2017/0244523 A1* | 8/2017 | Yang | H04L 67/104 |
| 2018/0019851 A1* | 1/2018 | Takeda | H04W 16/32 |
| 2019/0174466 A1* | 6/2019 | Zhang | H04L 5/0048 |
| 2019/0253201 A1* | 8/2019 | Ye | H04L 1/1887 |
| 2020/0305168 A1* | 9/2020 | Liou | H04W 72/0493 |
| 2021/0212105 A1* | 7/2021 | Takeda | H04L 1/0003 |
| 2021/0219271 A1* | 7/2021 | Takeda | H04L 1/1893 |
| 2021/0235485 A1 | 7/2021 | Xu | |
| 2021/0250970 A1* | 8/2021 | Ekpenyong | H04L 1/1887 |

OTHER PUBLICATIONS

Written Opinion issued in International Application No. PCT/JP2018/021288, dated Jul. 24, 2018 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Extended European Search Report issued in counterpart European Patent Application No. 18920708.7, dated Dec. 1, 2021 (10 pages).
InterDigital Inc.; "On remaining aspects of UL data transmission without grant"; 3GPP TSG RAN WG1 Meeting #90, R1-1714160; Prague, Czech Republic; Aug. 21-25, 2017 (5 pages).
Office Action issued in Japanese Application 2020-522561 dated Apr. 26, 2022 (7 pages).
Vivo, "UL data transmission procedure" 3GPP TSG RAN WG1 Meeting 90bis, R1-1717500, Prague, CZ, Oct. 9-13, 2017 (13 pages).
3GPP TS 38.331 V15.1.0, "3rd Generation Partnership Project; Technical Specification Group Radio Access Network; NR; Radio Resource Control (RRC) protocol specification (Release 15)"; Mar. 2018 (268 pages).

* cited by examiner

DCI FORMAT 0_0

| DCI BIT FIELD | SIZE (BIT) |
|---|---|
| Identifier for DCI formats | 1 |
| Frequency domain resource assignment | Variable; BWP & RA type config. dependent (depend on DCI size budget) |
| Time domain resource assignment | 0, 1, 2, 3, or 4; pusch-AllocationList dependent (per UL BWP) |
| Frequency hopping flag | 0, or 1; RA type config. dependent & only applicable to RA type 1 (per UL BWP) |
| Modulation and coding scheme | 5; mcs-Table or mcs-TableTransformPrecoder dependent (per UL BWP) |
| New data indicator | 1 |
| Redundancy version | 2 |
| HARQ process number | 4 (fixed at 16 HARQ processes) |
| TPC command for scheduled PUSCH | 2; pusch-PowerControl dependent (per UL BWP) |
| UL/SUL indicator | 0/1 bit |

DCI FORMAT 0_1

| DCI BIT FIELD | SIZE (BIT) |
|---|---|
| Identifier for DCI formats | 1 |
| Carrier Indicator | 0, or 3; CA config. dependent (per UE) |
| UL/SUL indicator | 0, or 1; SUL config. dependent (per cell) |
| Bandwidth part indicator | 0, 1, or 2; BWP config. dependent (per cell) |
| Frequency domain resource assignment | Variable; BWP & RA type config. dependent (per UL BWP) |
| Time domain resource assignment | 0, 1, 2, 3, or 4; pusch-AllocationList dependent (per UL BWP) |
| Frequency hopping flag | 0, or 1; RA type config. dependent & only applicable to RA type 1 (per UL BWP) |
| Modulation and coding scheme | 5; mcs-Table or mcs-TableTransformPrecoder dependent (per UL BWP) |
| New data indicator | 1 |
| Redundancy version | 2 |
| HARQ process number | 4 (fixed at 16 HARQ processes) |
| 1st downlink assignment index | 1 for semi-static HARQ-ACK codebook; 2 for dynamic HARQ-ACK codebook with single HARQ-ACK codebook. (per UE) |
| 2nd downlink assignment index | 2 for dynamic HARQ-ACK codebook with two HARQ-ACK sub-codebooks, i.e. TB-based + CBG-based; 0 otherwise. (per UE) |
| TPC command for scheduled PUSCH | 2; pusch-PowerControl dependent (per UL BWP) |
| SRS resource indicator | Variable; SRS-SetUse dependent (per UL BWP) |
| Precoding information and number of layers | 0, 1, 2, 3, 4, 5, or 6; UL MIMO config. dependent (per UL BWP) |
| Antenna ports | 2, 3, 4, or 5; UL MIMO config. dependent (per UL BWP) |
| SRS request | 2 or 3; SUL (per cell) & SRS resource config. dependent (per UL BWP) |
| CSI request | 0, 1, 2, 3, 4, 5, or 6; ReportTriggerSize dependent (per UL BWP) |
| CBG transmission information (CBGTI) | 0, 2, 4, 6 or 8; maxCodeBlockGroupsPerTransportBlock dependent (per cell) |
| PTRS-DMRS association | 0 or 2; UL-PTRS and PUSCH-tp dependent (per UL BWP) |
| beta_offset indicator | 0 or 2; uci-on-PUSCH dependent (per UL BWP) |
| DMRS sequence initialization | 0 or 1; PUSCH-tp dependent (per UL BWP) |

COMMON CONFIGURATION INFORMATION (ConfiguredGrantConfig EXCLUDING rrc-ConfiguredUplinkGrant)

| PARAMETER | USE OF RRC CONFIGURATION | |
|---|---|---|
| | USE | NOT USE |
| frequencyHopping (FH mode) | O | |
| cg-DMRS-Configuration | O | |
| transformPrecoder | O | |
| mcs-Table | O | |
| mcs-TableTransformPrecoder | O | |
| uci-OnPUSCH | O | |
| rbg-Size | O | |
| powerControlLoopToUse | O | |
| p0-PUSCH-Alpha | O | |
| nrofHARQ-Processes | O | |
| repK | | MAY NOT BE USED |
| repK-RV | | MAY NOT BE USED |
| periodicity | O | |
| configuredGrantTimer | O | |

FIG. 3

CONFIGURED GRANT TYPE 1 CONFIGURATION INFORMATION (rrc-ConfiguredUplinkGrant)

| PARAMETER | USE OF RRC CONFIGURATION | |
|---|---|---|
| | USE | NOT USE |
| timeDomainOffset | ○ | |
| timeDomainAllocation | ○ | |
| frequencyDomainAllocation | ○ | |
| antennaPort | ○ | |
| dmrs-SeqInitialization | ○ | |
| precodingAndNumberOfLayers | ○ | |
| srs-ResourceIndicator | ○ | |
| mcsAndTBS | ○ | |
| frequencyHoppingOffset | ○ | |
| pathlossReferenceIndex | | MAY NOT BE USED |

FIG. 4

METHOD AND DEVICE FOR APPLYING A PUSCH CONFIGURATION TO A RETRANSMISSION

TECHNICAL FIELD

The present invention relates to a user terminal and a radio base station in next-generation mobile communication systems.

BACKGROUND ART

In the universal mobile telecommunications system (UMTS) network, the specifications of long-term evolution (LTE) have been drafted for the purpose of further increasing high speed data rates, providing lower delays, and the like (see Non-Patent Literature 1). In addition, the specifications of LTE-A (LTE Advanced, also referred to as LTE Rel. 10, 11 or 12) have been drafted for the purpose of further widening bandwidth and speeding up from LTE (also referred to as LTE Rel. 8 or 9). LTE successor systems (also referred to as, for example, FRA (Future Radio Access), 5G (5th generation mobile communication system), 5G+(plus), new radio (NR), new radio access (NX), future generation radio access (FX), LTE Rel. 13, 14 or 15 or later) are also under study.

In the existing LTE systems (for example, LTE Rel. 8 to 13), downlink (DL) and/or uplink (UL) communication are performed using 1-ms subframes (also referred to as "transmission time intervals (TTIs)" and the like). Such a subframe is a unit of time of transmitting one channel-encoded data packet, and serves as a unit of processing in, for example, scheduling, link adaptation, retransmission control (hybrid automatic repeat request (HARQ)), and the like.

The radio base station controls data allocation (scheduling) to user terminals, and notifies the user terminals of data scheduling using downlink control information (DCI). The user terminal monitors the downlink control channel (PDCCH) to which downlink control information is transmitted and performs reception processing (demodulation, decoding processing, etc.), and controls reception of DL data and/or transmission of uplink data on the basis of the received downlink control information.

Transmission of the downlink control channel (PDCCH/EPDCCH) is controlled by using an aggregation of one or more control channel elements (CCE/enhanced control channel element (ECCE)). Further, each control channel element is composed of a plurality of resource element groups (REG/enhanced resource element group (EREG)). The resource element group is also used when mapping the control channel to the resource element (RE).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (for example, NR), in addition to scheduling transmission by downlink control information, configuring periodic transmission by higher layers has been considered. The periodic transmission is, for example, configured grant-based transmission or semi-persistent transmission.

It is considered that such retransmission of periodic transmission is scheduled by downlink control information. However, it is not decided how to configure the retransmission. If retransmission is not configured properly, communication performance may deteriorate.

An object of the present disclosure is to provide a user terminal and a radio base station that appropriately configure retransmission for transmission following higher layer configurations.

Solution to Problem

A user terminal according to an aspect of the present disclosure includes a receiving section configured to receive first downlink control information for activation of a first channel following periodicity configured by a higher layer and receive second downlink control information for scheduling retransmission of the first channel; and a control section configured to apply a given parameter in first configuration information indicating a configuration for the first channel, second configuration information indicating a configuration for a second channel with periodicity not configured by a higher layer, and the second downlink control information, to the retransmission.

Advantageous Effects of Invention

According to the present invention, retransmission can be appropriately configured for transmission following higher layer configurations.

BRIEF DESCRIPTION OF DRAWINGS

FIG. 1 is a diagram to show an example of fields in DCI format 0_0.

FIG. 2 is a diagram to show an example of fields in DCI format 0_1.

FIG. 3 is a diagram to show an example of parameters used for retransmission in common configuration information.

FIG. 4 is a diagram to show an example of parameters used for retransmission in configured grant type 1 configuration information.

DESCRIPTION OF EMBODIMENTS

Figure 5:
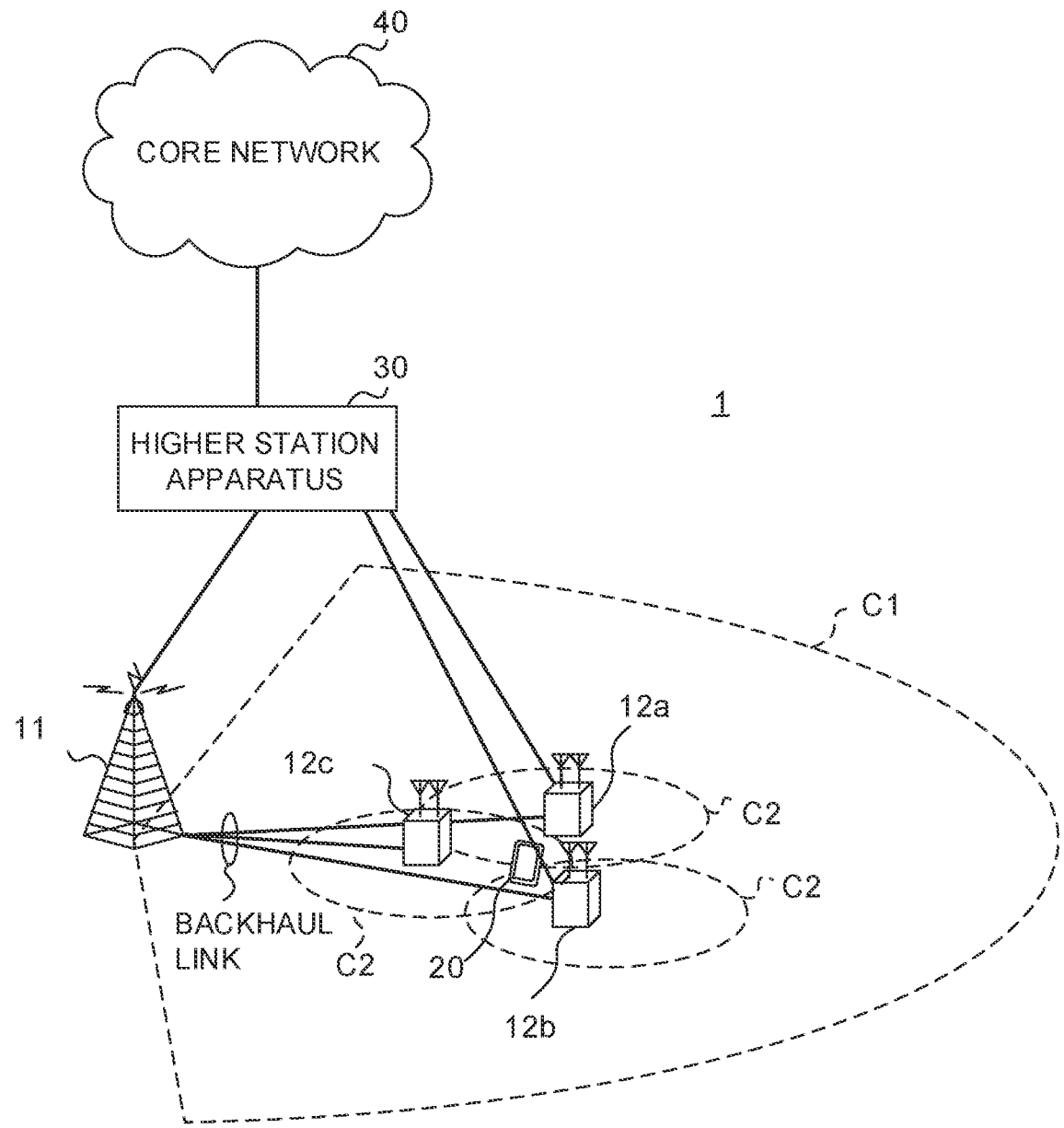
FIG. 5 is a diagram to show an example of a schematic structure of a radio communication system according to one embodiment of the present invention.

For UL transmission of NR, dynamic grant-based transmission and configured grant-based transmission have been considered.

Dynamic grant-based transmission is a method of performing UL transmission using an uplink shared channel (for example, physical uplink shared channel (PUSCH)) based on a dynamic UL grant (dynamic grant, dynamic UL grant).

The configured grant-based transmission is a method of performing UL transmission using an uplink shared channel (for example, PUSCH) based on the UL grant configured by the higher layer (for example, it may be called configured grant, configured UL grant, etc.). In the configured grant-based transmission, UL resources are already allocated to the UE, and the UE can voluntarily perform UL transmission using the configured resource, and thus low delay communication can be expected to be realized.

Dynamic grant-based transmission may be called dynamic grant-based PUSCH, UL transmission with dynamic grant, PUSCH with dynamic grant, and UL transmission with UL grant, UL grant-based transmission, UL transmission scheduled by dynamic grant (transmission resource-configured), or the like.

Configured grant-based transmission may be called configured grant-based PUSCH, UL Transmission with configured grant, PUSCH with configured grant, UL Transmission without UL grant, UL grant-free transmission, UL transmission scheduled by configured grant (transmission resource-configured), or the like.

Also, the configured grant-based transmission may be defined as one type of UL semi-persistent scheduling (SPS).

Several types (type 1, type 2, etc.) have been considered for configured grant-based transmission.

In configured grant type 1 transmission (type 1 PUSCH transmission with configured grant), the parameters used for configured grant-based transmission (which may be called configured grant-based transmission parameter, configured grant parameter, etc.) are configured in the UE using only higher layer signaling.

In configured grant type 2 transmission (type 2 PUSCH transmission with configured grant), the configured grant parameter is configured in the UE by higher layer signaling. In the configured grant type 2 transmission, the UE may be notified of at least some of the configured grant parameters by physical layer signaling (for example, activation downlink control information (DCI) described later).

Here, the higher layer signaling may be, for example, any of radio resource control (RRC) signaling, medium access control (MAC) signaling, broadcast information and so on, or a combination thereof.

For the MAC signaling, for example, a MAC control element (MAC CE), a MAC protocol data unit (PDU), or the like may be used. The broadcast information may be, for example, a master information block (MIB), a system information block (SIB), a minimum system information (remaining minimum system information (RMSI)), other system information (OSI), or the like.

The configured grant parameter may be configured in the UE using ConfiguredGrantConfig information element (configured grant configuration information) of RRC. The configured grant parameter may include, for example, information specifying a configured grant resource. The configured grant parameter may include, for example, information regarding a configured grant index, time offset, periodicity, the number of times of repeated transmission of a transport block (TB) (which may be expressed as the number of times of repetition, K), and a redundancy version (RV) sequence used for repeated transmission, and the above-mentioned timer.

Here, the periodicity and the time offset may be represented in units of symbols, slots, subframes, frames, or the like. The periodicity may be indicated by, for example, a given number of symbols. The time offset may be indicated, for example, by an offset with respect to the timing of a given index (e.g., slot number=0 and/or system frame number=0). The number of times of repeated transmission may be an arbitrary integer, for example, 1, 2, 4, 8, or the like. When the number of times of repeated transmission is n (>0), the UE may transmit a given TB by using the configured grant-based PUSCH using n transmission occasions.

The UE may judge that one or more configured grants have been triggered when the configured grant type 1 transmission is configured. The UE may perform PUSCH transmission by using a configured grant-based transmission resource that has been configured (which may be referred to as a configured grant resource, a transmission occasion, or the like). Even when the configured grant-based transmission is configured, the UE may skip the configured grant-based transmission when data is absent in a transmission buffer.

The UE may judge that one or more configured grant transmissions have been triggered (or activated) when the configured grant type 2 transmission is configured and a notification of a given activation signal is given. The given activation signal (activation DCI) may be DCI (PDCCH) that is cyclic redundancy check (CRC) scrambled by a given identifier (for example, CS-RNTI: configured scheduling RNTI). It should be noted that the DCI may be used for control of release (which may also be referred to as deactivate, or the like), retransmission, or the like of the configured grant transmission.

The UE may judge whether to perform PUSCH transmission using the configured grant resource configured in the higher layer on the basis of the given activation signal. The UE may release the resource (PUSCH) corresponding to the configured grant on the basis of the DCI for releasing the configured grant or the expiration of a given timer (elapse of a given time).

Even when the configured grant-based transmission is activated (in the active state), the UE may skip the configured grant-based transmission when data is absent in the transmission buffer.

It should be noted that each of the dynamic grant and the configured grant may be called an actual UL grant. That is, the actual UL grant may be higher layer signaling (for example, ConfiguredGrantConfig information element of RRC), physical layer signaling (for example, the above-mentioned given activation signal), or a combination thereof.

The UE may support the repetition of PUSCH in one slot or support the repetition of PUSCH over multiple slots in the configured grant type 1 transmission. The UE may support the repetition of PUSCH in one slot or support the repetition of PUSCH over multiple slots in the configured grant type 2 transmission. The configuration information of the configured grant (configured grant configuration information, ConfiguredGrantConfig) is configured by the higher layer and may include the number of times of repetition of data (repK).

The UE may support the repetition of PUSCH in one slot or support the repetitive transmission of PUSCH over multiple slots in the dynamic grant-based transmission. The configuration information of the dynamic grant-based transmission (dynamic grant configuration information, PUSCH configuration information, PUSCH-Config) is configured in the UE by the higher layer and may include the number of times of repetition of data (pusch-AggregationFactor, aggregation-factor-UL).

The UE may support the repetition of PDSCH in one slot or support the repetition of PDSCH over multiple slots in the PDSCH. The configuration information of PDSCH (PDSCH configuration information, PDSCH-Config) is configured by the higher layer and may include the number of times of repetition of data (pdsch-AggregationFactor, aggregation-factor-DL).

Further, the UE may have a configuration of a periodic resource for SPS by, for example, higher layer signaling (e.g., SPS configuration information, SPS-Config), and at least one of transmission and reception using the resource may be activated or released (deactivated) by downlink control information (DCI) notified using PDCCH.

The PDCCH (DCI) for SPS may be CRC (Cyclic Redundancy Check) scrambled by a radio network temporary identifier (RNTI) for SPS. The RNTI for SPS may be called configured scheduling RNTI (CS-RNTI).

Note that the SPS is assumed to be downlink data SPS (which may be referred to as DL SPS, SPS PDSCH, or the like), but may be read as uplink data SPS (which may be referred to as UL SPS, SPS PUSCH, or the like).

Further, the search space in which the UE monitors PDCCH candidates may be the following search spaces. That is, the types of search spaces may be classified into CSS and USS, and furthermore a plurality of types may be configured in the CSS, or all types of CSS below may not be classified, but may be treated comprehensively as CSS.

Type 0-PDCCH CSS
Type 0A-PDCCH CSS
Type 1-PDCCH CSS
Type 2-PDCCH CSS
Type 3-PDCCH CSS
USS Type 0-PDCCH CSS may be called an SS for DCI format in which cyclic redundancy check (CRC) bits are masked (scrambled) by a system information radio network temporary identifier (SI-RNTI).

Type 0A-PDCCH CSS may be called an SS for DCI format that is CRC scrambled by SI-RNTI. Type 0-PDCCH may be used, for example, for notification of RMSI, and type 0A-PDCCH may be used, for example, for notification of other SI (other system information (SI): OSI).

Type 1-PDCCH CSS may be called an SS for DCI format that is CRC scrambled by a random access RNTI (RA-RNTI), a temporary cell RNTI (TC-RNTI), or a cell RNTI (C-RNTI).

Type 2-PDCCH CSS may be called an SS for DCI format that is CRC scrambled by paging RNTI (P-RNTI).

Type 3-PDCCH CSS may be called an SS for DCI format that is CRC scrambled by INT-RNTI (INTerruption RNTI) for DL preemption indication, SFI-RNTI (Slot Format Indicator RNTI) for slot format indication, TPC-PUSCH-RNTI for transmit power control (TPC) of physical uplink shared channel (PUSCH), TPC-PUCCH-RNTI for TPC of physical uplink control channel (PUCCH), TPC-SRS-RNTI, C-RNTI, or configured scheduling RNTI (CS-RNTI) for TPC of sounding reference signal (SRS).

USS may be called an SS for DCI format that is CRC scrambled by C-RNTI or CS-RNTI. In USS, monitoring of at least one or more DCI formats 0_0, 0_1, 1_0, 1_1 can be configured.

It can be said that the type of search space is information that associates the search space with a DCI feature (format, RNTI, or the like) transmitted in a PDCCH candidate to be monitored.

Here, CS-RNTI is used for control of at least one of downlink transmission and uplink transmission without dynamic scheduling. The downlink transmission is also called semi-persistent scheduling (SPS), semi-persistent transmission, downlink SPS, or the like. In addition, the uplink transmission is also called configured grant-based transmission, uplink configured grant-based transmission, or the like.

In SPS, at least one of activation, release (deactivation), and retransmission of PDSCH transmission in a given periodicity may be controlled by DCI that is CRC scrambled by CS-RNTI.

In the configured grant-based transmission, at least one of activation, deactivation, and retransmission of PUSCH transmission of a given periodicity may be controlled by DCI that is CRC scrambled by CS-RNTI. In dynamic grant-based transmission (initial transmission or retransmission), scheduling may be controlled by DCI that is CRC scrambled by C-RNTI.

In each DCI format, it has been considered that the size of DCI using CS-RNTI is the same as the size of DCI using C-RNTI. Specifically, the following has been considered.

UE, in a corresponding search space, performs blind decoding of DCI format on the assumption that the size of DCI using DCI format 1_1 with CRC scrambled by CS-RNTI is the same as the size of DCI using DCI format 1_1 with CRC scrambled by C-RNTI.

UE, in a corresponding search space, performs blind decoding of DCI format on the assumption that the size of DCI using DCI format 0_1 with CRC scrambled by CS-RNTI is the same as the size of DCI using DCI format 0_1 with CRC scrambled by C-RNTI.

UE, in a corresponding search space, performs blind decoding of DCI format on the assumption that the size of DCI using DCI format 1_0 with CRC scrambled by CS-RNTI is the same as the size of DCI using DCI format 1_0 with CRC scrambled by C-RNTI.

UE, in a corresponding search space, performs blind decoding of DCI format on the assumption that the size of DCI using DCI format 0_0 with CRC scrambled by CS-RNTI is the same as the size of DCI using DCI format 0_0 with CRC scrambled by C-RNTI.

In LTE, there is no different higher layer parameter between DC with CRC scrambled by SPS-C-RNTI and DCI with CRC scrambled by C-RNTI, and thus there is no difference between these DCIs.

In NR, some parameters for configured grant (for example, RA type (resource allocation type), transformer precoder, frequency hopping, or the like) can be configured separately from the parameters for dynamic grant. Therefore, the DCI structure for configured grant-based transmission may differ from the DCI structure for dynamic grant-based transmission.

It is considered that the UE does not monitor the PDCCH with CRC scrambled by C-RNTI and the PDCCH with CRC scrambled by CS-RNTI in the type 3-CSS on the SCell.

It is considered that, when cross-carrier scheduling and CS-RNTI are configured from a component carrier (CC) to another CC, the UE monitors at least one of DCI format 0_1 and DCI format 1_1 with CRC scrambled by CS-RNTI and carrier indicator field (CIF) in a given cell. In DCI using CS-RNTI, CIF is used for performing activation of SPS or configured grant type 2 transmission from a CC in which the DCI format is monitored to another CC.

The UE notified of the activation of the configured grant-based transmission performs the configured grant-based transmission according to the configured grant-based configuration information.

On the other hand, it is not decided whether the UE notified of the retransmission of the configured grant-based transmission follows dynamic grant configuration information or configured grant configuration information.

Also, it is considered that the size of DCI for activation/release using CS-RNTI (activation/release DCI) and the size of DCI for scheduling retransmission using CS-RNTI (retransmission scheduling DCI) are the same.

If both the PUSCH triggered by the activation/release DCI and the retransmission PUSCH scheduled by the retransmission scheduling DCI follow the configured grant configuration information, the UE is needed to distinguish whether the DCI using CS-RNTI is the activation/release DCI or the retransmission scheduling DCI. In this case, the UE can distinguish the DCI by using at least one field of new data indicator (NDI), HARQ process number (HPN (ID)), and redundancy version (RV) in the DCI using CS-RNTI.

However, if the initial transmission based on the activation/release DCI follows the configured grant configuration information and the retransmission based on the retransmission scheduling DCI follows the dynamic grant configuration information, it is considered that, between the activation/release DCI and the retransmission scheduling DCI, at least one field of NDI, HPN, and RV has a different bit position. Therefore, the UE may not be able to correctly distinguish between the activation/release DCI and the retransmission scheduling DCI due to ambiguity.

If the retransmission of the configured grant follows the configured grant configuration information, it is a problem which information the number of times of repetition (repetition factor) K of repetitive transmission (repetition) in the retransmission, the RV of the retransmission, the time/frequency domain resource allocation (RA) of the retransmission of the configured grant type 1 transmission follows.

Therefore, the present inventors have conceived application of an appropriate parameter of first configuration information indicating a configuration for a first channel transmitted according to the periodicity configured by the higher layer (for example, PUSCH of the configured grant transmission, PDSCH of SPS), second configuration information indicating a configuration for a second channel transmitted not according to the periodicity (for example, PUSCH, PDSCH scheduled by the dynamic grant), and the retransmission scheduling DCI, to the retransmission.

Hereinafter, embodiments according to the present invention will be described in detail with reference to the drawings. The following aspects may be applied independently or may be applied in combination.

In the following description, a case will be described where the present invention is applied to the initial transmission and retransmission of configured grant-based transmission of UL, but the present invention can also be applied to SPS (DL SPS). Therefore, the configured grant-based transmission may be read as SPS. The configured grant configuration information may be read as SPS configuration information (SPS-Config). The dynamic grant configuration information may be read as PDSCH configuration information (PDSCH-Config). The configured grant-based transmission, SPS may be called a channel following a periodicity (time resource) configured by a higher layer, a channel not scheduled by DCI (dynamic grant), or the like. Ordinary PUSCH, PUDSCH may be called a channel for which a periodicity (time resource) is not configured by a higher layer, a channel scheduled by DCI (dynamic grant), or the like.

(First Aspect)

In the first aspect, at least one parameter for retransmission scheduled by DCI with CRC scrambled by CS-RNTI follows the configured grant configuration information. In other words, the initial transmission and the retransmission of the configured grant transmission follow the same higher layer parameters.

The initial transmission of the configured grant transmission follows the configured grant configuration information.

If the number of times of repetition K is configured in the UE as part of the configured grant configuration information, the same number of times of repetition may be applied to the retransmission scheduled using the DCI with CRC scrambled by CS-RNTI. Even if the number of times of repetition is configured in the UE as part of the dynamic grant configuration information, the number of times of repetition in the dynamic grant configuration information may not be used for the PUSCH scheduled using the DCI with CRC scrambled by CS-RNTI. For example, when the number of times of repetition in the dynamic grant configuration information indicates 1 and the number of times of repetition in the configured grant configuration information indicates 4, the UE adopts the number of times of repetition 4 in the configured grant configuration information for the PUSCH scheduled using the DCI with CRC scrambled by CS-RNTI.

In the configured grant type 1 transmission, the activation/release DCI may not be used and the retransmission scheduling DCI may be used.

For the configured grant type 1 transmission, the time/frequency domain resource allocation of the retransmission PUSCH scheduled by using the DCI with CRC scrambled by CS-RNTI may follow the higher layer configuration (configuration information for the configured grant type 1 transmission of the configured grant configuration information (configured grant type 1 configuration information, rrc-ConfiguredUplinkGrant)). Even if the retransmission scheduling DCI includes the time/frequency domain resource allocation field, this time/frequency domain resource allocation field may not be used.

When both the initial transmission and the retransmission of the configured grant transmission may follow the configured grant configuration information, the bit position of a specific field (specific DCI field) may be fixed between the activation/release DCI and the retransmission scheduling DCI. The specific field may be at least one of NDI (e.g., 1 bit), RV (e.g., 2 bits), and HPN (e.g., 4 bits).

For example, when the activation/release DCI and the retransmission scheduling DCI use the DCI format 0_0, the bit positions of the specific fields in these DCIs may follow FIG. 1. For example, when the activation/release DCI and the retransmission scheduling DCI use the DCI format 0_1, the bit positions of the specific fields in these DCIs may follow FIG. 2.

The UE may assume that the specific field is at a fixed bit position in the DCI regardless of whether the DCI using CS-RNTI is the activation/release DCI or the retransmission scheduling DCI. The UE may determine whether the DCI is the activation/release DCI or the retransmission scheduling DCI on the basis of the specific field in a fixed bit position in the DCI using CS-RNTI.

According to the above first aspect, when the specific field in the DCI using CS-RNTI is at a fixed bit position, the UE can easily read the field, and NW does not have to control a DCI structure and the processing load on the UE and NW can be suppressed. Also, the UE can distinguish whether the DCI using CS-RNTI is the activation/release DCI or the retransmission scheduling DCI.

(Second Aspect)

In the second aspect, at least one parameter for retransmission scheduled by DCI with CRC scrambled by CS-RNTI follows the dynamic grant configuration information. In other words, the initial transmission and the retransmission of the configured grant transmission follow different higher layer parameters. The retransmission of the configured grant transmission may not follow the configured grant configuration information.

The initial transmission of the configured grant transmission follows the configured grant configuration information.

When the number of times of repetition K is configured as part of the dynamic grant configuration information, the number of times of repetition (pusch-AggregationFactor, aggregation-factor-UL) in the dynamic grant configuration information may be applied to the retransmission scheduled using the DCI with CRC scrambled by CS-RNTI. In other words, the number of times of repetition K in the configured grant configuration information may be applied only to the initial transmission (transmission that is not retransmission).

At least one of time domain resource allocation and frequency domain resource allocation of the retransmission PUSCH scheduled using DCI with CRC scrambled by CS-RNTI may follow fields (time domain resource assignment, frequency domain resource assignment) in the retransmission scheduling DCI based on the dynamic grant configuration information with respect to the configured grant type 1 transmission. By using the DCI for allocation of retransmission resources, it is possible to flexibly configure retransmission resources.

Bit positions of fields in the DCI may differ between the DCI following the configured grant configuration information and the DCI following the dynamic grant configuration information. This occurs when the configuration values of various parameters used for PUSCH transmission vary between the configured grant configuration information (ConfiguredGrantConfig) and the dynamic grant configuration information (PUSCH-Config), for example.

One of the following options 1 and 2 may be applied to the activation/release DCI and the retransmission scheduling DCI.

(Option 1)

Even if the initial transmission and the retransmission of the configured grant transmission follow different higher layer parameters, the bit position of the specific field may be fixed between the activation/release DCI and the retransmission scheduling DCI.

The UE may assume that the specific field is at a fixed bit position in the DCI regardless of whether the DCI is the activation/release DCI or the retransmission scheduling DCI.

NW (e.g., radio base station, gNB, eNB, transmission/reception point (TRP)) can determine at least one of the number, the position, and the order of bits of fields in the DCI by the configuration of various parameters. The NW may configure various parameters such that the bit position of the specific field is fixed between the activation/release DCI of PUSCH and the retransmission DCI of PUSCH.

The configuration by the NW preferably avoids an increase in the complexity of blind decoding (BD) at the UE and a limitation on the scheduling at the NW. It is preferable that the total bit size (DCI payload) of the activation/release DCI do not become larger than the size (DCI payload) of a normal dynamic grant. When configuring each parameter included in the configured grant configuration information (ConfiguredGrantConfig) and the dynamic grant configuration information (PUSCH-Config), NW performs control such that the bit position of the specific field is the same for the DCI for the dynamic grant PUSCH that is CRC masked by C-RNTI and the DCI for the configured grant PUSCH that is CRC masked by CS-RNTI.

By fixing the bit position of the specific field between the activation/release DCI and the retransmission scheduling DCI, the UE can reduce the load as compared with the case of searching for the specific field from two bit positions. Moreover, since the UE does not erroneously detect the bit position, the false alarm rate can be reduced.

(Option 2)

A difference in bit position of a specific field may be allowed between the activation/release DCI and the retransmission scheduling DCI.

The UE may check the two sets of bit positions of a specific field in the DCI. The two sets may respectively indicate the bit position of the specific field in the activation/release DCI and the bit position of the specific field in the retransmission scheduling DCI. For example, the UE may read (attempt to read) a specific field from the bit position of each of two preset sets, and, based on the specific field of the set from which a normal value has been read, identify whether it is the activation/release DCI or the retransmission scheduling DCI.

The NW can flexibly configure the DCI by allowing the position of the specific field to be different depending on the use of the DCI.

According to the second aspect described above, by using the dynamic grant configuration information for the retransmission of the configured grant transmission, it is possible to configure a parameter different from that of the initial transmission of the configured grant transmission, and to give a characteristic different from that of the initial transmission.

(Third Aspect)

In the third aspect, some parameters for retransmission scheduled by DCI with CRC scrambled by CS-RNTI follow the configured grant configuration information, and some other parameters follow the dynamic grant configuration information.

PUSCH retransmissions scheduled using DCI with CRC scrambled by CS-RNTI may be treated as configured grant-based transmission (PUSCH transmission with configured grant) and, with some exceptions, may follow the configured grant configuration information.

Some exceptions of the configuration information for configured grant type 1 among the configured grant configuration information (configured grant type 1 configuration information, rrc-ConfiguredUplinkGrant) may not be applied to retransmission (may be negligible).

The exceptions may include a time domain offset (timeDomainOffset) in the configured grant type 1 configuration information, and may follow an instruction (field, for example, time domain resource assignment) in the DCI for retransmission scheduling.

Further, the exceptions may also include a pathloss reference index (pathlossReferenceIndex). The pathloss reference index indicates reference signal (RS, e.g., CSI-RS, SS block) used for PUSCH pathloss estimation. The following methods may be used to determine the pathloss reference index.

If the configured grant type 1 configuration information (rrc-ConfiguredUplinkGrant) in the configured grant configuration information includes the pathloss reference index (pathlossReferenceIndex) with respect to the PUSCH transmission configured by the configured grant configuration information (ConfiguredGrantConfig), an RS resource index $q_d$ may be provided by the value of the pathloss reference index.

If the configured grant type 1 configuration information in the configured grant configuration information does not include the pathloss reference index with respect to the PUSCH transmission configured by the configured grant configuration information, the UE may determine an RS resource index $q_d$ based on the value of the PUSCH pathloss reference RS-ID (for example, PUSCH-PathlossReferenceRS-Id) mapped in the sounding reference signal (SRS) resource indicator (SRI) field in the DCI format that activates the PUSCH transmission. If the DCI format that activates the PUSCH transmission does not include the SRI field, the UE may determine the RS resource as if the corresponding PUSCH pathloss reference RS-ID is equal to 0.

Some exceptions of configuration information other than the configured grant type 1 configuration information among configured grant configuration information (configuration information and common configuration information for both configured grant type 1 transmission and configured grant type 2 transmission) may not be applied to retransmission (may be negligible).

The exceptions may be the number of times of repetition (repK) and RV sequence (repK-RV, RV pattern). The RV sequence may include a given number (for example, 4) of RVs (RV indices). The RV sequence may indicate one of {0,2,3,1}, {0,3,0,3}, and {0,0,0,0}.

The number of times of repetition in the retransmission of the configured grant transmission may be assumed (fixed) to 1 regardless of the configured grant configuration information (even if the number of times of repetition is set to more than 1 by the configured grant configuration information). That is, the UE may not perform repetitive transmission in the retransmission of the configured grant transmission. Further, the UE may refer to the number of times of repetition in the configured grant configuration information in the initial transmission of the configured grant transmission, and may refer to the number of times of repetition in the dynamic grant configuration information in the retransmission of the configured grant transmission. For example, the number of times of repetition in the dynamic grant configuration information may be different from the number of times of repetition in the configured grant configuration information. For example, the number of times of repetition in the dynamic grant configuration information may be smaller than the number of times of repetition in the configured grant configuration information. For example, the UE may set the number of times of repetition of the initial transmission of the configured grant transmission to 8 on the basis of the configured grant configuration information and set the number of times of repetition of the retransmission of the configured grant transmission to 2 on the basis of the dynamic grant configuration information.

The RV in the retransmission may follow an instruction (field, for example, redundancy version) in the retransmission scheduling DCI. For example, the instruction in DCI may indicate the first RV of a given RV sequence. In this case, any order of {0,2,3,1}, {0,3,0,3}, and {0,0,0,0} may be applied cyclically for the other indices following repeated indices that are given the first RV.

As shown in FIG. 3, for both the configured grant type 1 transmission and the configured grant type 2 transmission, at least one of the following parameters may reuse the configured grant configuration information for retransmission.

Frequency hopping (frequency hopping mode): frequencyHopping
Configured grant DMRS configuration: cg-DMRS-Configuration
Transformer precoder (enabling transformer precoder): transformPrecoder
modulation and coding scheme (MCS) table: mcs-Table
MCS table for transform precoding: mcs-TableTransformPrecoder
UCIonPUSCH (dynamic beta offset or quasi-static beta offset): uci-OnPUSCH
resource element group (REG) bundle group (RBG) size: rbg-Size
Use closed power control loop: powerControlLoopToUse
P0_PUSCH-Alpha-index (index of {P0_PUSCH,α} set): p0-PUSCH-Alpha
The number of HARQ processes: nrofHARQ-Processes
Configured grant timer: configuredGrantTimer For both the configured grant type 1 transmission and the configured grant type 2 transmission, a redundancy version sequence for repetition of retransmission may follow the redundancy version sequence (repK-RV) for repetition in the configured grant configuration information, or may be a fixed RV sequence (RV cycling), e.g., {0,2,3,1}. The first RV in the retransmission may be based on an RV field in the retransmission scheduling DCI.

For both the configured grant type 1 transmission and the configured grant type 2 transmission, the periodicity in the configured grant configuration information may not be applied to the retransmission (may be negligible).

For the configured grant type 1 transmission, the pathloss reference index in the configured grant configuration information may be reused for the retransmission.

As shown in FIG. 4, for the configured grant type 1 transmission, at least one of the following parameters in the configured grant configuration information may use an instruction in DCI for retransmission scheduling.

DMRS sequence initialization: dmrs-SeqInitialization
Time domain offset: timeDomainOffset
Time domain allocation: timeDomainAllocation
Frequency domain allocation: frequencyDomainAllocation
Antenna port: antennaPort
Precoding and number of layers: precodingAndNumberOfLayers
SRS resource indicator: srs-ResourceIndicator
MCS and transport block size (TBS): mcsAndTBS
Frequency hopping offset: frequencyHoppingOffset Note that for the configured grant type 1 transmission, at least one of these parameters may use the configured grant configuration information.

According to the above third aspect, the retransmission can be flexibly configured by specifying, for each parameter, which of the configured grant configuration information, the dynamic grant configuration information, and the retransmission scheduling DCI is used.

(Radio Communication System)

Now, the structure of a radio communication system according to one embodiment of the present invention will be described below. In this radio communication system, communication is performed using one or a combination of the radio communication methods according to the embodiments of the present invention described above.

FIG. 5 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

The radio communication system 1 may be called long term evolution (LTE), LTE-advanced (LTE-A), LTE-beyond (LTE-B), SUPER 3G, IMT-Advanced, 4th generation mobile communication system (4G), 5th generation mobile communication system (5G), new radio (NR), future radio access (FRA), New-radio access technology (RAT), and the like, or may be called a system that achieves these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 are assumed to use the macro cell C1 and the small cells C2 at the same time using CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as an "existing carrier", a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The radio base station 11 and the radio base station (or between 2 radio base stations 12) may be connected by wire (for example, means in compliance with the common public radio interface (CPRI) such as optical fiber, an X2 interface and so on) or wirelessly.

The radio base station 11 and the radio base station 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station", a "central node", an "eNB (eNodeB)", a "transmitting/receiving point" and so on. Also, the radio base stations 12 are radio base stations having local coverages, and may be referred to as "small base stations", "micro base stations", "pico base stations", "femto base stations", "home eNodeBs (HeNBs)", "remote radio heads (RRHs)", "transmitting/receiving points" and so on. Hereinafter the radio base stations 11 and 12 will be collectively referred to as "radio base stations 10", unless specified otherwise.

The user terminals 20 are terminals to support various communication schemes such as LTE and LTE-A, and may include not only mobile communication terminals (mobile stations) but also stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. The uplink and downlink radio access schemes are not limited to combinations of these, and other radio access schemes may be used.

In the radio communication system 1, a downlink shared channel (physical downlink shared channel (PDSCH)), which is used by each user terminal 20 on a shared basis, a broadcast channel (physical broadcast channel (PBCH)), downlink L1/L2 control channels and so on are used as downlink channels. User data, higher layer control information and system information blocks (SIBs) are communicated by the PDSCH. Further, master information block (MIB) is transmitted by the PBCH.

The downlink L1/L2 control channels include physical downlink control channel (PDCCH), enhanced physical downlink control channel (EPDCCH), physical control format indicator channel (PCFICH), physical hybrid-ARQ indicator channel (PHICH) and so on. Downlink control information (DCI), including PDSCH and/or PUSCH scheduling information, and so on, is communicated by the PDCCH.

Note that scheduling information may be reported via DCI. For example, the DCI to schedule receipt of DL data may be referred to as "DL assignment", and the DCI to schedule transmission of UL data may be referred to as "UL grant".

The number of OFDM symbols to use for the PDCCH is communicated by the PCFICH. Hybrid automatic repeat request (HARQ) delivery acknowledgment information (also referred to as, for example, "retransmission control information", "HARQ-ACKs", "ACK/NACKs" and so on) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (physical uplink shared channel (PUSCH)), which is used by each user terminal 20 on a shared basis, an uplink control channel (physical uplink control channel (PUCCH)), a random access channel (physical random access channel (PRACH)) and so on are used as uplink channels. User data, higher layer control information, and the like are communicated by the PUSCH. Also, in the PUCCH, downlink radio quality information (channel quality indicator (CQI)), delivery acknowledgment information, scheduling requests (SRs) and so on are communicated. By means of the PRACH, random access preambles for establishing connections with cells are communicated.

In the radio communication systems 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (sounding reference signals (SRSs)), demodulation reference signals (DMRSs) and so on are communicated as uplink reference signals. Note that, DMRSs may be referred to as "user terminal-specific reference signals (UE-specific Reference Signals)". Also, the reference signals to be communicated are by no means limited to these.

(Radio Base Station)

Figure 6:
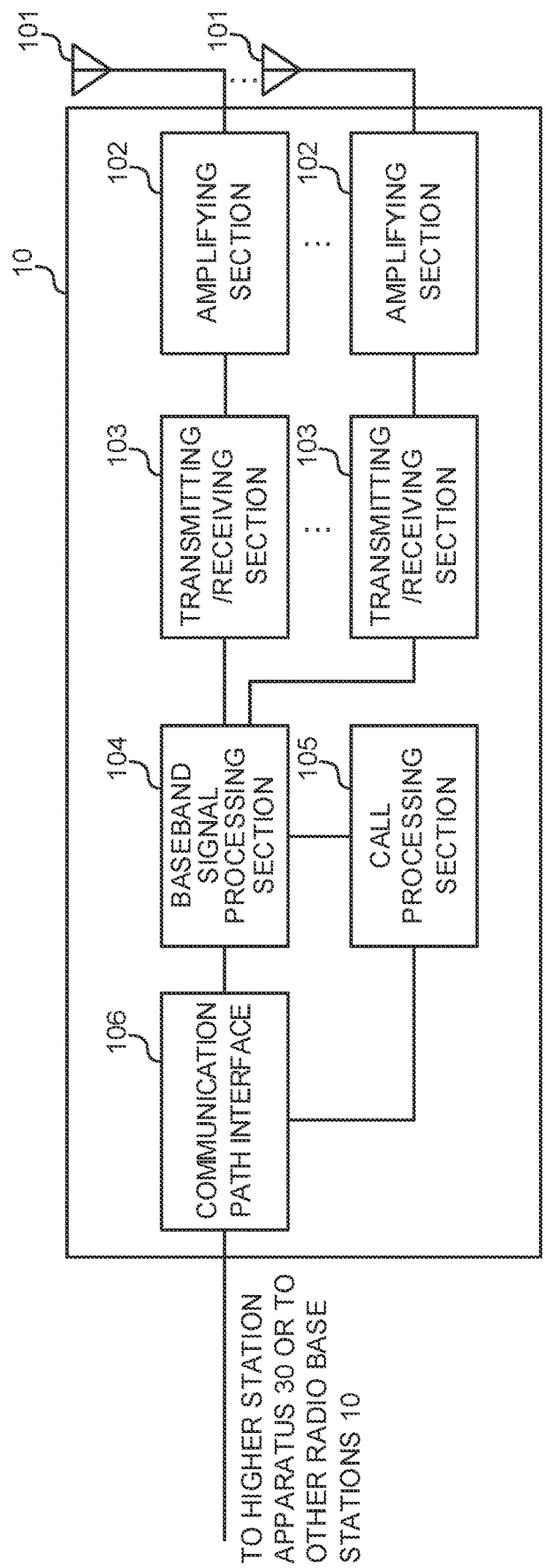
FIG. 6 is a diagram to show an example of an overall structure of a radio base station according to one embodiment of the present invention.

FIG. 6 is a diagram to show an example of an overall structure of a radio base station according to one embodiment of the present invention. Each radio base station 10 has a plurality of transmitting/receiving antennas 101, amplifying sections 102, transmitting/receiving sections 103, a baseband signal processing section 104, a call processing section 105 and a transmission path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the transmission path interface 106.

In the baseband signal processing section 104, user data is subjected to transmission processes, including a packet data convergence protocol (PDCP) layer process, division and coupling of the user data, radio link control (RLC) layer transmission processes such as RLC retransmission control, medium access control (MAC) retransmission control (for example, an HARQ transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processing such as channel coding and inverse fast Fourier transform, and the results are forwarded to the transmitting/receiving sections 103.

Baseband signals that are pre-coded and output from the baseband signal processing section 104 on an antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatuses that can be described based on general understanding of the technical field to which the present invention pertains. Note that the transmitting/receiving section 103 may be composed of a transmitting/receiving section in one entity, or may be composed of a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103, and output to the baseband signal processing section 104.

In the baseband signal processing section 104, user data included in the input uplink signal is subjected to fast Fourier transform (FFT) processing, inverse discrete Fourier transform (IDFT) processing, error correction decoding, receiving processing for MAC retransmission control, and receiving processing for an RLC layer and a PDCP layer, and the uplink data is forwarded to the higher station apparatus 30 via the transmission path interface 106. The call processing section 105 performs call processing (such as setting and releasing) for communication channels, manages states of the radio base stations 10, manages the radio resources, and so on.

The transmission path interface 106 transmits and receives signals to and from the higher station apparatus 30 via a given interface. Moreover, the transmission path interface 106 may transmit and receive (perform backhaul signaling for) signals with other radio base stations 10 via an inter-base station interface (for example, means in compliance with common public radio interface (CPRI), such as optical fiber, the X2 interface and so on).

Figure 7:
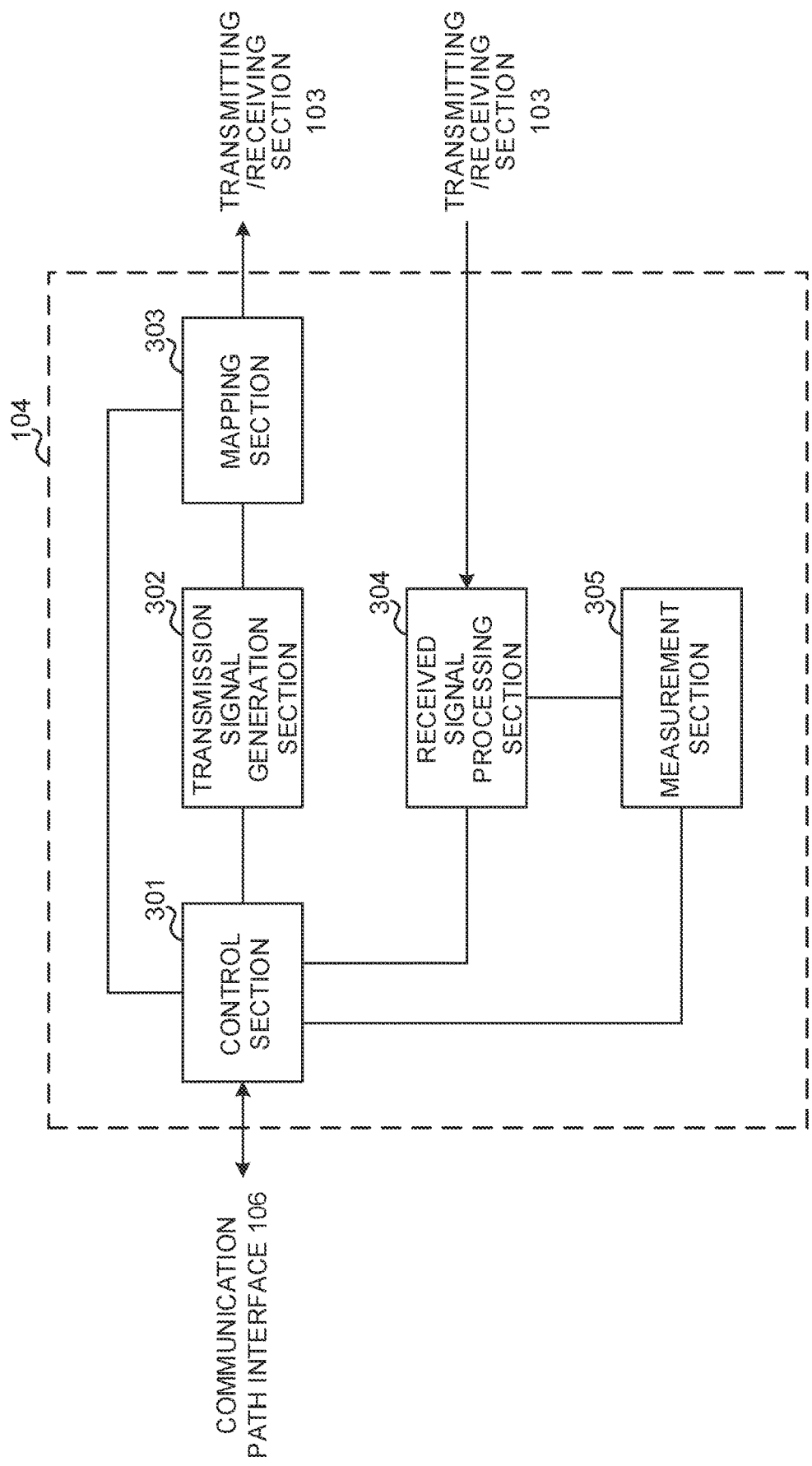
FIG. 7 is a diagram to show an example of a functional structure of a radio base station according to one embodiment of the present invention.

FIG. 7 is a diagram to show an example of a functional structure of a radio base station according to one embodiment of the present invention. Note that, although this example will primarily show functional blocks that pertain to characteristic parts of the present embodiment, it may be assumed that the radio base station 10 has other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these configurations have only to be included in the radio base station 10, and some or all of the configurations may not be included in the baseband signal processing section 104.

The control section (scheduler) 301 controls the whole of the radio base station 10. The control section 301 can be constituted by a controller, a control circuit or a control apparatus that can be described based on general understanding of the technical field to which the present invention pertains.

The control section 301, for example, controls the generation of signals in the transmission signal generation section 302, the allocation of signals by the mapping section 303 and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, such as delivery acknowledgement information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the primary synchronization signal (PSS)/secondary synchronization signal (SSS)), downlink reference signals (for example, the CRS, the CSI-RS, and the DMRS) and so on.

The transmission signal generation section 302 generates downlink signals (downlink control signals, downlink data signals, downlink reference signals and so on) based on instruction from the control section 301, and outputs these signals to the mapping section 303. The transmission signal generation section 302 can be constituted by a signal generator, a signal generating circuit or a signal generation apparatus that can be described based on general understanding of the technical field to which the present invention pertains.

For example, the transmission signal generation section 302 generates DL assignments, which report downlink data allocation information, and/or UL grants, which report uplink data allocation information, based on the instruction from the control section 301. DL assignments and UL grants are both DCI, and follow the DCI format. Further, the downlink data signals are subjected to coding processing and modulation processing in accordance with a coding rate and a modulation scheme, which are determined based on channel state information (CSI) reported from each user terminal 20.

The mapping section 303 maps the downlink signals generated in the transmission signal generation section 302 to given radio resources based on instruction from the control section 301, and outputs these to the transmitting/receiving sections 103. The mapping section 303 can be constituted by a mapper, a mapping circuit or a mapping apparatus that can be described based on general understanding of the technical field to which the present invention pertains.

The received signal processing section 304 performs receiving processes (for example, demapping, demodulation, decoding and so on) for received signals input from the transmitting/receiving sections 103. Here, the received signals include, for example, uplink signals transmitted from the user terminals 20 (uplink control signals, uplink data signals, uplink reference signals, etc.). The received signal processing section 304 can be constituted by a signal processor, a signal processing circuit or a signal processing apparatus that can be described based on general understanding of the technical field to which the present invention pertains.

The received signal processing section 304 outputs, to the control section 301, information decoded by the receiving processing. For example, when a PUCCH containing an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or a measurement apparatus that can be described based on general understanding of the technical field to which the present invention pertains.

For example, the measurement section 305 may perform radio resource management (RRM) measurement, channel state information (CSI) measurement, and the like based on the received signals. The measurement section 305 may measure the received power (for example, reference signal received power (RSRP)), the received quality (for example, reference signal received quality (RSRQ), signal to interference plus noise ratio (SINR), signal to noise ratio (SNR)), the signal strength (for example, received signal strength indicator (RSSI)), transmission path information (for example, CSI), and so on. The measurement results may be output to the control section 301.

Further, the transmitting/receiving section 103 may transmit first downlink control information (for example, DCI with CRC scrambled by CS-RNTI) for activation of the first channel (for example, PUSCH of configured grant transmission, PDSCH of SPS) following the periodicity configured by the higher layer and may transmit second downlink control information (for example, DCI with CRC scrambled by CS-RNTI) for scheduling the retransmission of the first channel.

Further, the control section 301 may match the position of the specific field in the second downlink control information with the position of the specific field in the first downlink control information.

Further, the control section 301 may apply a given parameter in the first configuration information indicating the configuration for the first channel, the second configuration information indicating the configuration for the second channel (for example, PUSCH, PDSCH scheduled by the dynamic grant) for which the periodicity is not configured by the higher layer, and the second downlink control information, to the retransmission.

Further, the control section 301 may not apply at least one of the periodicity, the number of times of repetition, the redundancy version sequence, and the periodicity in the first configuration information, to the retransmission.

Further, the control section 301 may apply at least one of the time domain resource allocation and the redundancy version in the second downlink control information, to the retransmission.

Further, the control section 301 may not apply the parameter for the configured grant type 1 transmission among the first configuration information, to the retransmission.

(User Terminal)

Figure 8:
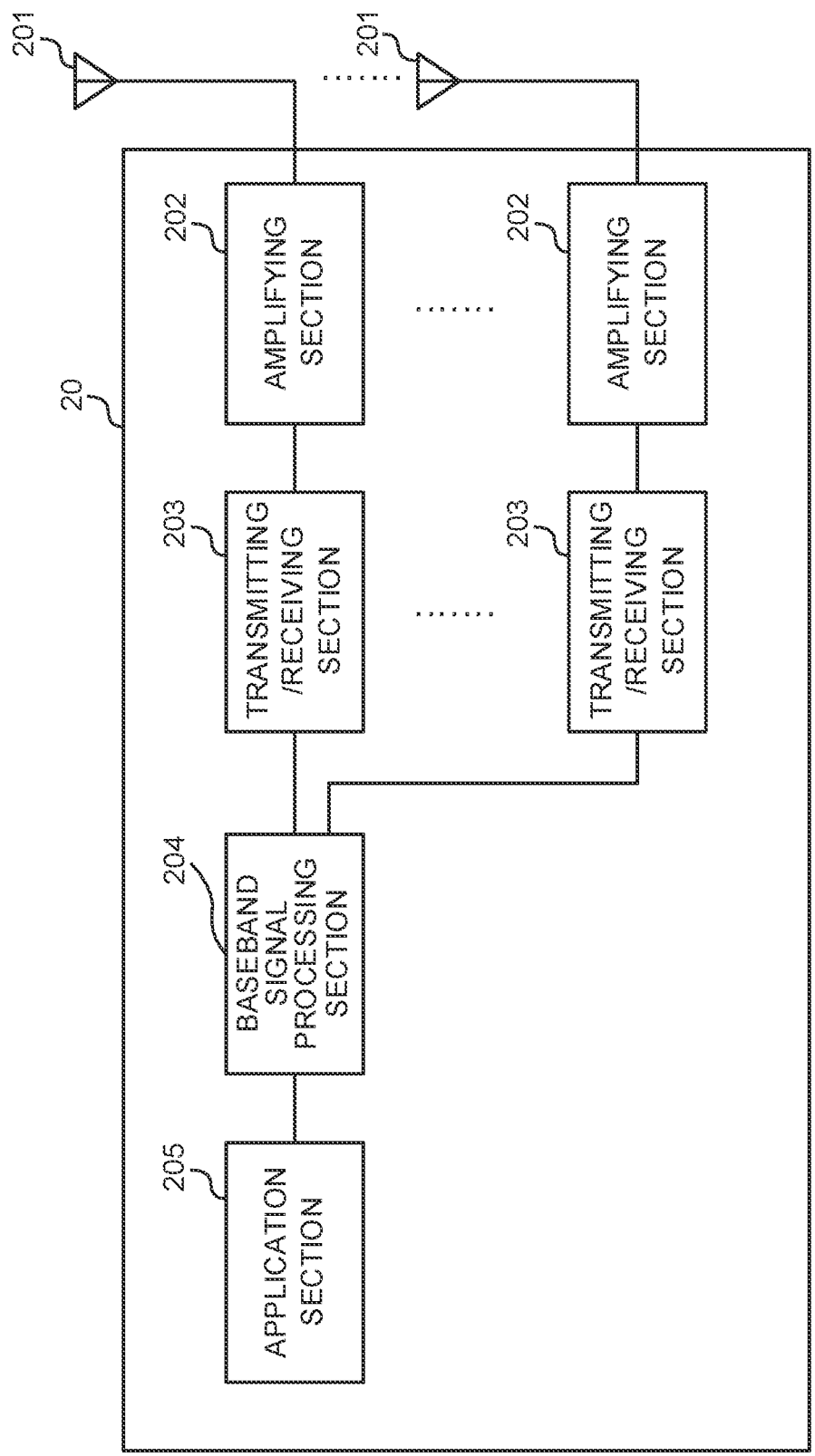
FIG. 8 is a diagram to show an example of an overall structure of a user terminal according to one embodiment of the present invention.

FIG. 8 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving apparatuses that can be described based on general understanding of the technical field to which the present invention pertains. The transmitting/receiving section 203 may be composed of an integrated transmitting/receiving section, or may be composed of a transmitting section and a receiving section.

The baseband signal processing section 204 performs receiving processes for the input baseband signal, including an FFT process, error correction decoding, a retransmission control receiving process and so on. Downlink user data is forwarded to the application section 205. The application section 205 performs processes related to higher layers above the physical layer and the MAC layer, and so on.

Further, in the downlink data, broadcast information may also be transferred to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals having been subjected to frequency conversion in the transmitting/receiving sections 203 are amplified in the amplifying sections 202, and transmitted from the transmitting/receiving antennas 201.

Figure 9:
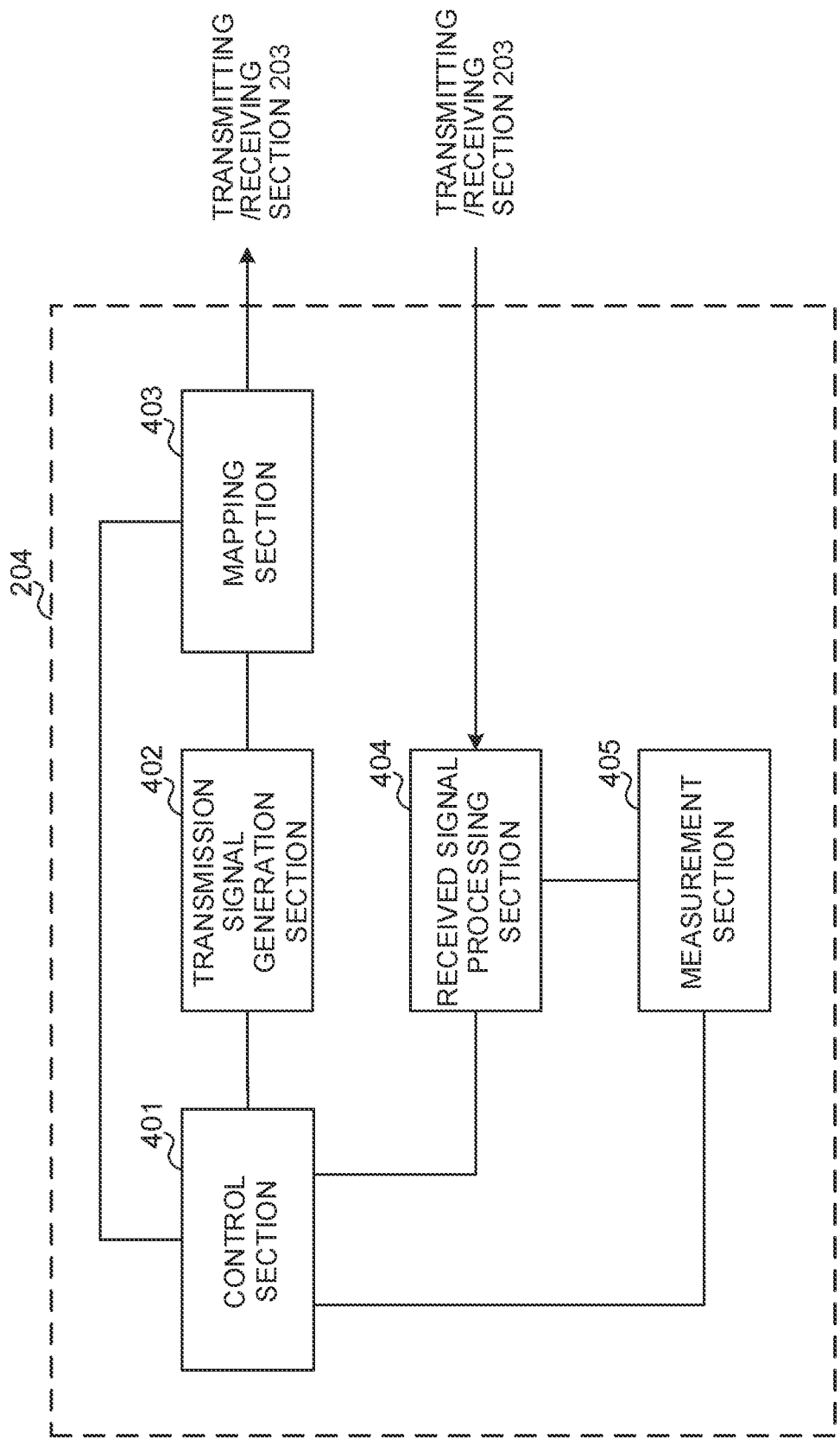
FIG. 9 is a diagram to show an example of a functional structure of a user terminal according to one embodiment of the present invention.

FIG. 9 is a diagram to show an example of a functional structure of a user terminal according to one embodiment of the present invention. Note that, although this example will primarily show functional blocks that pertain to characteristic parts of the present embodiment, it may be assumed that the user terminal 20 has other functional blocks that are necessary for radio communication as well.

The baseband signal processing section 204 provided in the user terminal 20 at least includes the control section 401, a transmission signal generation section 402, a mapping section 403, a received signal processing section 404, and a measurement section 405. Note that these configurations only have to be included in the user terminal 20, and some or all of the configurations may not be included in the baseband signal processing section 204.

The control section 401 controls the whole of the user terminal 20. The control section 401 can be constituted by a controller, a control circuit or a control apparatus that can be described based on general understanding of the technical field to which the present invention pertains.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals, which are transmitted from the radio base station 10, from the received signal processing section 404. The control section 401 controls the generation of uplink control signals and/or uplink data signals based on results of determining whether or not retransmission control is necessary for the downlink control signals and/or the downlink data signals.

The transmission signal generation section 402 generates uplink signals (uplink control signals, uplink data signals, uplink reference signals, etc.) based on instruction from the control section 401, and outputs these signals to the mapping section 403. The transmission signal generation section 402 can be constituted by a signal generator, a signal generating circuit or a signal generation apparatus that can be described based on general understanding of the technical field to which the present invention pertains.

For example, the transmission signal generation section 402 generates uplink control signals regarding delivery acknowledgement information, channel state information (CSI) and so on, based on instruction from the control section 401. Also, the transmission signal generation section 402 generates uplink data signals based on instruction from the control section 401. For example, when a UL grant is included in the downlink control signal reported from the radio base station 10, the transmission signal generation section 402 is instructed by the control section 401 to generate an uplink data signal.

The mapping section 403 maps the uplink signals generated in the transmission signal generation section 402 to radio resources based on instruction from the control section 401, and outputs the result to the transmitting/receiving section 203. The mapping section 403 can be constituted by a mapper, a mapping circuit or a mapping apparatus that can be described based on general understanding of the technical field to which the present invention pertains.

The received signal processing section 404 performs receiving processing (for example, demapping, demodulation, decoding and so on) for received signals input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or a measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, SNR), the signal strength (for example, RSSI), transmission path information (for example, CSI), and so on. The measurement results may be output to the control section 401.

Further, the transmitting/receiving section 203 may receive first downlink control information (for example, DCI with CRC scrambled by CS-RNTI) for activation of the first channel (for example, PUSCH of configured grant transmission, PDSCH of SPS) following the periodicity configured by the higher layer and may receive second downlink control information (for example, DCI with CRC scrambled by CS-RNTI) for scheduling the retransmission of the first channel.

Further, the control section 401 may apply a given parameter in the first configuration information (for example, configured grant configuration information) indicating the configuration for the first channel, the second configuration information (for example, dynamic grant configuration information) indicating the configuration for the second channel (for example, PUSCH, PDSCH scheduled by the dynamic grant) for which the periodicity is not configured by the higher layer, and the second downlink control information, to the retransmission.

Further, the control section 401 may not apply at least one of the periodicity, the number of times of repetition, the redundancy version sequence, and the periodicity in the first configuration information, to the retransmission.

Further, the control section 401 may apply at least one of the time domain resource allocation and the redundancy version in the second downlink control information, to the retransmission.

Further, the control section 401 may assume that the position of the specific field in the downlink control information is fixed regardless of whether the received downlink control information is the first downlink control information or the second downlink control information.

Further, the control section 401 may identify whether the downlink control information is the first downlink control information or the second downlink control information on the basis of the specific field in the received downlink control information.

Further, for the control section 401, the control section may not apply the parameter for the configured grant type 1 transmission among the first configuration information (for example, at least one parameter in the configured grant type 1 configuration information), to the retransmission.

(Hardware Configuration)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be achieved by a single apparatus physically or logically aggregated, or may be achieved by directly or indirectly connecting two or more physically or logically separate apparatuses (for example, using wires, radio, or the like) and using these plural apparatuses.

Figure 10:
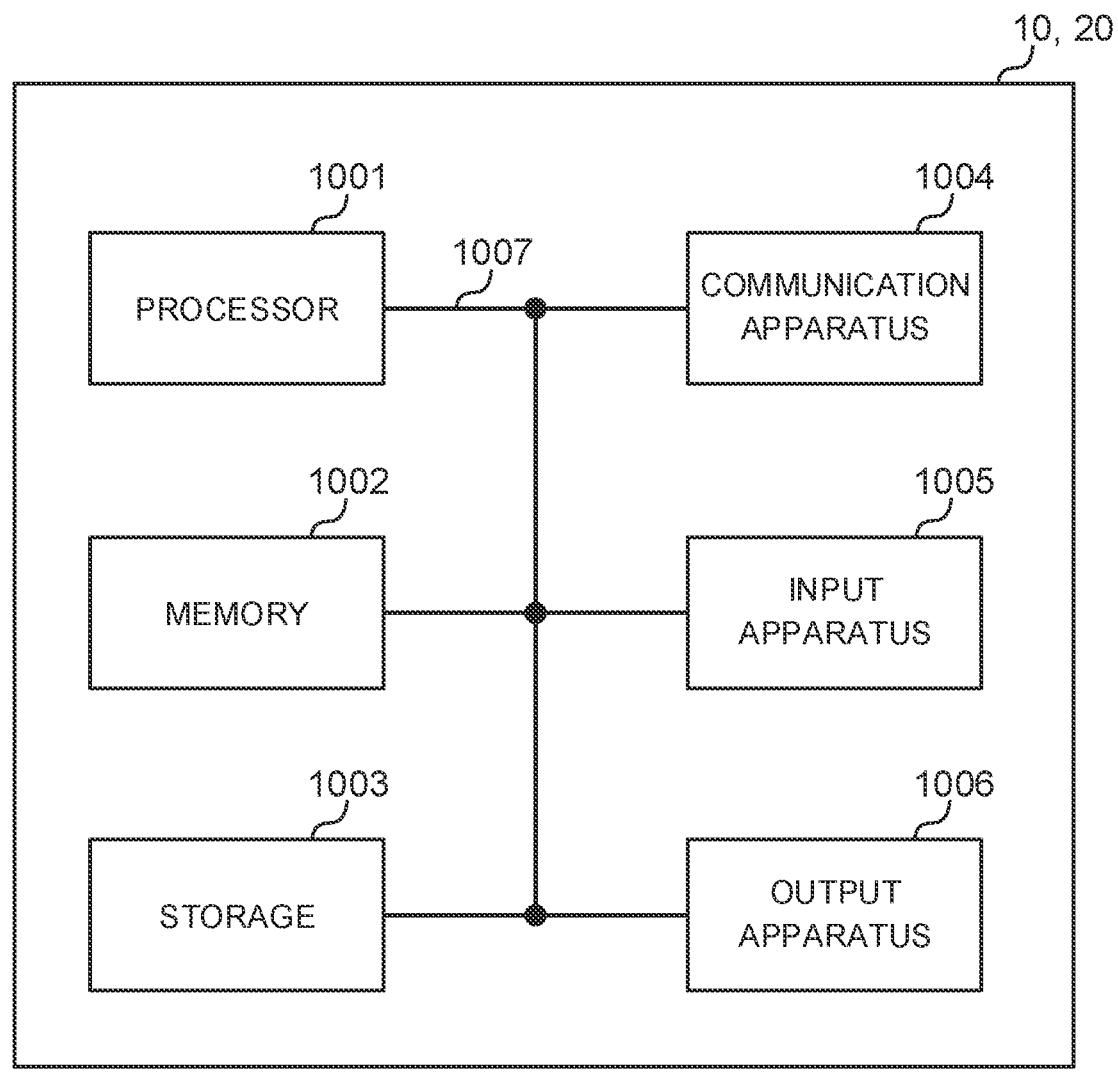
FIG. 10 is a diagram to show an example of a hardware configuration of a radio base station and a user terminal according to one embodiment of the present invention.

For example, the radio base station, user terminals and so on according to embodiments of the present disclosure may function as a computer that executes the processes of the radio communication method of the present disclosure. FIG. 10 is a diagram illustrating an example of a hardware configuration of each of the radio base station and the user terminal according to the embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, and a bus 1007.

Note that, in the following description, the word "apparatus" may be replaced by "circuit", "device", "unit" and so on. The hardware configuration of each of the radio base station 10 and the user terminal 20 may be composed so as to include one or plurality of each apparatus illustrated in the drawing, or may be composed so as not to include a part of the apparatuses.

For example, although only one processor 1001 is illustrated, a plurality of processors may be provided. Furthermore, processes may be implemented on one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002 such that the processor 1001 performs calculations, and by controlling the communication in the communication apparatus 1004, and at least one of the reading and writing of data in the memory 1002 and the storage 1003.

The processor 1001 may control the whole computer by, for example, running an operating system. The processor 1001 may be configured with a central processing unit (CPU), which includes interfaces with peripheral apparatuses, a control apparatus, a computing apparatus, a register, and the like. For example, the baseband signal processing section 104 (204), the call processing section 105, and the like, which are mentioned above, may be achieved by the processor 1001.

Furthermore, the processor 1001 reads programs (program codes), software modules or data, from at least one of the storage 1003 and the communication apparatus 1004, into the memory 1002, and executes various processes according to these. As for the programs, programs causing computers to execute at least part of the operations of the above-described embodiments may be used. For example, the control section 401 of the user terminal 20 may be achieved by a control program that is stored in the memory 1002 and operates in the processor 1001, and other functional blocks may be achieved likewise.

The memory 1002 is a computer-readable recording medium, and may be constituted by, for example, at least one of a read only memory (ROM), an erasable programmable ROM (EPROM), an electrically EPROM (EEPROM), a random access memory (RAM) and/or other appropriate storage media. The memory 1002 may be referred to as a "register", a "cache", a "main memory (primary storage apparatus)" and so on. The memory 1002 can store a program (program code), a software module, and the like, which are executable for implementing the radio communication method according to the embodiment of the present disclosure.

The storage 1003 is a computer-readable recording medium, and for example, may be composed of at least one of a flexible disk, a floppy (registered trademark) disk, a magneto-optical disk (for example, a compact disc (compact disc ROM (CD-ROM) and the like), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be called an auxiliary storage apparatus.

The communication apparatus 1004 is hardware (transmitting/receiving device) for performing inter-computer communication via at least one of a wired network and a wireless network, and for example, is referred to as "network device", "network controller", "network card", "communication module", and the like. The communication apparatus 1004 may be configured to include a high frequency switch, a duplexer, a filter, a frequency synthesizer and so on in order to realize, for example, at least one of frequency division duplex (FDD) and time division duplex (TDD). For example, the transmitting/receiving antennas 101 (201), the amplifying sections 102 (202), the transmitting/receiving sections 103 (203), the transmission path interface 106, and the like, which are mentioned above, may be achieved by the communication apparatus 1004.

The input apparatus 1005 is an input device for receiving input from the outside (for example, a keyboard, a mouse, a microphone, a switch, a button, a sensor and so on). The output apparatus 1006 is an output device for allowing output to the outside (for example, a display, a speaker, an light emitting diode (LED) lamp and so on). The input apparatus 1005 and the output apparatus 1006 may have an integrated configuration (for example, a touch panel).

Furthermore, these pieces of apparatus, including the processor 1001, the memory 1002 and so on are connected by the bus 1007 for communicating information. The bus 1007 may be composed using a single bus, or may be composed using buses different between the apparatuses.

Also, the radio base station 10 and the user terminal 20 may be configured to include hardware such as a microprocessor, a digital signal processor (DSP), an application-specific integrated circuit (ASIC), a programmable logic device (PLD), and a field programmable gate array (FPGA), and all or some of the functional blocks may be implemented by the hardware. For example, the processor 1001 may be implemented with at least one of these pieces of hardware.

(Variations)

Note that the terminology used in the present disclosure and the terminology that is needed to understand the present disclosure may be replaced by other terms that convey the same or similar meanings. For example, at least one of "channels" and "symbols" may be replaced by "signals" (or "signaling"). The signal may also be a message. A reference signal may be abbreviated as an "RS", and may be referred to as a "pilot", a "pilot signal" and so on, depending on standard applies to be applied. Furthermore, a component carrier (CC) may be referred to as a "cell", "frequency carrier", "carrier frequency", or the like.

The radio frame may be composed of one or a plurality of periods (frames) in the time domain. Each of the one or plurality of periods (frames) constituting a radio frame may be referred to as a "subframe". Furthermore, a subframe may be comprised of one or a plurality of slots in the time domain. A subframe may be a fixed time duration (for example, 1 ms) that is not dependent on numerology.

Here, the numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), the number of symbols per TTI, a radio frame configuration, specific filtering processing to be performed by a transceiver in the frequency domain, specific windowing processing to be performed by the transceiver in the time domain, and the like.

A slot may be comprised of one or a plurality of symbols in the time domain (orthogonal frequency division multiplexing (OFDM) symbols, single carrier frequency division multiple access (SC-FDMA) symbols, and so on). Further, the slot may be a unit of time based on numerology.

A slot may include a plurality of minislots. Each minislot may be comprised of one or more symbols in the time domain. Also, a minislot may be referred to as a "subslot". Each minislot may be comprised of fewer symbols than a slot. A PDSCH (or PUSCH) transmitted in a unit of time larger than a minislot may be referred to as PDSCH (PUSCH) mapping type A. A PDSCH (or PUSCH) transmitted using a minislot may be referred to as "PDSCH (PUSCH) mapping type B".

Each of the radio frame, the subframe, the slot, the minislot, and the symbol represents a unit of time at the time of transmitting a signal. A radio frame, a subframe, a slot, a minislot, and a symbol each may be called by other corresponding applicable names.

For example, one subframe may be called a transmission time interval (TTI), or a plurality of consecutive subframes may be called the TTI, or one slot or one minislot may be called the TTI. That is, at least one of a subframe and a TTI may be a subframe (1 ms) in existing LTE, may be a shorter period than 1 ms (for example, one to thirteen symbols), or may be a period of time longer than 1 ms. Note that the unit to represent the TTI may be referred to as a "slot", a "minislot" and so on, instead of a "subframe".

Here, a TTI refers to the minimum time unit of scheduling in radio communication, for example. For example, in LTE systems, a radio base station schedules radio resources (frequency bandwidth and transmission power that can be used in each user terminal, and the like) to allocate to each user terminal on a TTI basis. Note that the definition of TTIs is not limited thereto.

TTI may be a unit of time of transmitting channel-encoded data packets (transport blocks), code blocks, codewords, and the like, or may be a unit of processing for scheduling, link adaptation, and the like. When TTI is given, a time interval (for example, the number of symbols) in which the transport blocks, the code blocks, the codewords, and the like are actually mapped may be shorter than the TTI.

Note that, when one slot or one minislot is referred to as a "TTI", one or more TTIs (that is, one or more slots or one or more minislots) may be the minimum time unit of scheduling. Moreover, the number of slots (the number of minislots) which constitute the minimum time unit of the scheduling may be controlled.

TTI having a time length of 1 ms may be called usual TTI (TTI in LTE Rel. 8 to 12), normal TTI, long TTI, a usual subframe, a normal subframe, a long subframe, a slot, or the like. A TTI that is shorter than a usual TTI may be referred to as "shortened TTI", "short TTI", "partial TTI" (or "fractional TTI"), "shortened subframe", "short subframe", "minislot", "sub-slot", "slot", or the like.

Note that a long TTI (for example, a normal TTI, a subframe, etc.) may be replaced by a TTI having a time duration exceeding 1 ms, and a short TTI (for example, a shortened TTI) may be replaced by a TTI having a TTI duration less than the TTI duration of a long TTI and not less than 1 ms.

The resource block (RB) is the unit of resource allocation in the time domain and the frequency domain, and may include one or plurality of consecutive subcarriers in the frequency domain.

Also, an RB may include one or more symbols in the time domain, and may be one slot, one minislot, one subframe or one TTI in length. One TTI and one subframe each may be comprised of one or more resource blocks.

Note that one or more RBs may be referred to as a "physical resource block (PRB (Physical RB))", a "subcarrier group (SCG)", a "resource element group (REG)", a "PRB pair", an "RB pair" and so on.

Furthermore, a resource block may be comprised of one or a plurality of resource elements (REs). For example, one RE may be a radio resource region of one subcarrier and one symbol.

Note that the configurations of radio frames, subframes, slots, minislots, symbols, and the like described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs), and the like can be variously changed.

Also, the information and parameters described in the present disclosure may be represented in absolute values or in relative values with respect to given values, or may be represented using other applicable information. For example, a radio resource may be specified by a given index.

The names used for parameters and so on in the present disclosure are in no respect limiting. In addition, an equation and so on using these parameters may differ from those explicitly disclosed in the present disclosure. Since various channels (physical uplink control channel (PUCCH), physical downlink control channel (PDCCH), and the like) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols, chips, and the like that may be referenced throughout the above description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals, and the like may be input and output via a plurality of network nodes.

The information, signals, and the like that have been input and/or output may be stored in a specific location (for example, in a memory), or may be managed in a control table. The information, signals and so on to be input and/or output can be overwritten, updated or appended. The information, signals, and the like that are output may be deleted. The information, signals, and the like that are input, may be transmitted to other apparatuses.

The reporting of information is by no means limited to the aspects/embodiments described in the present disclosure, and may be performed using other methods. For example, the reporting of information may be implemented by physical layer signaling (for example, downlink control information (DCI), uplink control information (UCI)), higher layer signaling (for example, radio resource control (RRC) signaling, broadcast information (master information block (MIB), system information block (SIB), and the like), and medium access control (MAC) signaling), other signals or combinations of these.

Note that physical layer signaling may be referred to as "L1/L2 (Layer 1/Layer 2) control information (L1/L2 control signals)", "L1 control information (L1 control signal)" and so on. Also, RRC signaling may be referred to as "RRC messages", and can be, for example, an RRC connection setup (RRCConnectionSetup) message, RRC connection reconfiguration (RRCConnectionReconfiguration) message, and so on. Moreover, the MAC signaling may be reported using, for example, MAC control elements (MAC CEs).

Further, reporting of given information (for example, reporting of information to the effect that "X holds") does not necessarily have to be sent explicitly, and may be sent implicitly (for example, by not reporting this given information, or by reporting another piece of information).

Decisions may be made in values represented by one bit (0 or 1), may be made in Boolean values that represent true or false, or may be made by comparing numerical values (for example, comparison with a given value).

Regardless of whether referred to as "software", "firmware", "middleware", "microcode" or "hardware description language", or called by other names, software should be interpreted broadly to mean instructions, instruction sets, code, code segments, program codes, programs, subprograms, software modules, applications, software applications, software packages, routines, subroutines, objects, executable files, execution threads, procedures, functions and so on.

Also, software, instructions, information and so on may be transmitted and received via communication media. For example, when software is transmitted from a website, a server or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

In the present disclosure, the terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)", may be used interchangeably. The base station may be called a term such as a macro cell, a small cell, a femto cell, a pico cell, and the like.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (remote radio heads (RRHs))). The term "cell" or "sector" refers to all or part of the coverage area of at least one of a base station and a base station subsystem that provides communication services within this coverage.

In the present disclosure, the terms "mobile station (MS)" "user terminal", "user equipment (UE)", "terminal", etc. may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be called a transmitting device, a receiving device, or the like. Note that at least one of a base station and a mobile station may be a device mounted on a moving body, a moving body itself and so on. The moving body may be a transportation (for example, a car, an airplane and so on), an unmanned moving body (for example, a drone, an autonomous car and so on), or a (manned or unmanned) robot. Note that at least one of the base station and the mobile station also includes a device that does not necessarily move during a communication operation.

Furthermore, the radio base stations in the present disclosure may be replaced by user terminals. For example, each aspect/embodiment of the present disclosure may be applied to a configuration in which communication between a radio base station and a user terminal is replaced by communication among a plurality of user terminals (which may be referred to as, for example, device-to-device (D2D), vehicle-to-everything (V2X) and so on). In this case, user terminals 20 may have the functions of the radio base stations 10 described above. In addition, terms such as "uplink" and "downlink" may be interpreted as a term corresponding to communication between terminals (for example, "side"). For example, an uplink channel, a downlink channel, and the like may be replaced by side channels.

Likewise, the user terminals in the present disclosure may be interpreted as radio base stations. In this case, the radio base stations 10 may have the functions of the user terminals 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, mobility management entities (MMEs), serving-gateways (S-GWs) and so on may be possible, but these are not limiting) other than base stations, or combinations of these.

The aspects/embodiments described in the present disclosure may be used individually, in combinations, or may be switched depending on the mode of implementation. The order of processes, sequences, flowcharts and so on that have been used to describe the aspects/embodiments in the present disclosure may be re-ordered as long as inconsistencies do not arise. For example, although various methods have been described in the present disclosure with various components of steps using exemplary orders, the specific orders that are illustrated herein are by no means limiting.

The aspects/embodiments illustrated in the present disclosure may be applied to long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), New-radio access technology (RAT), new radio (NR), new radio access (NX), future generation radio access (FX), global system for mobile communications (GSM) (registered trademark), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), systems that use other adequate radio communication methods and/or next-generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on".

Reference to elements with designations such as "first", "second" and so on as used in the present disclosure does not generally limit the number/quantity or order of these elements. These designations are used in the present disclosure only for convenience, as a method for distinguishing between two or more elements. Hence, references of first and second elements do not mean that only two elements are adoptable, or that the first element must precede the second element in some way.

The terms "judge" and "determine" as used in the present disclosure may encompass a wide variety of actions. For example, "determining" may be regarded as "determining" judging, calculating, computing, processing, deriving, investigating, looking up (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing, and so on. In other words, to "judge" and "determine" as used in the present disclosure may be interpreted to mean making judgements and determinations related to some action.

In addition, to "judge" and "determine" as used herein may be interpreted to mean "assuming", "expecting", "considering" and so on.

The term "maximum transmission power" described in the present disclosure may mean the maximum value of transmission power, the nominal UE maximum transmit power, or the rated UE maximum transmit power.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced by "access".

In the present disclosure, when two elements are connected to each other, these elements can be considered "connected" or "coupled" to each other by using one or more electrical wires, cables, printed electrical connections, and the like, and, as some of non-limiting and non-inclusive examples, by using electromagnetic energy having wavelengths in a radio frequency domain, a microwave domain, an optical (both visible and invisible) domain, and the like.

In the present disclosure, the phrase "A and B are different" may mean "A and B are different from each other". The terms such as "leave" and "coupled" may be interpreted as well.

When the terms such as "include", "including", and variations of these are used in the present disclosure, these terms are intended to be inclusive, in a manner similar to the way the term "comprising" is used. Further, the term "or" used in the present disclosure is intended to be not exclusive OR.

For example, when articles, such as "a", "an", and "the" in English, are added by translation in the present disclosure, the present disclosure may include that nouns which follows these articles are in plural.

Now, although invention according to the present disclosure has been described above in detail, it is obvious to those skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description in the present disclosure is provided only for the purpose of explaining examples, and should by no means be construed to limit the invention according to the present disclosure in any way.

The invention claimed is:

1. A terminal comprising:
a receiver that receives a configured grant configuration; and
a processor that applies a first parameter which is a part of the configured grant configuration, to a retransmission of a physical uplink shared channel (PUSCH) based on the configured grant configuration,
wherein the configured grant configuration is applied to a configured-grant-type PUSCH transmission that is configured by higher layer signaling,
wherein the receiver receives a physical downlink control channel (PDCCH) with a cyclic redundancy check (CRC) scrambled by a configured scheduling radio network temporary identifier (CS-RNTI), which indicates the retransmission,
wherein the receiver receives a PUSCH configuration comprising a second parameter, which includes a number of repetitions of data, and
wherein the processor applies the second parameter to the retransmission.

2. The terminal according to claim 1, wherein the first parameter includes at least one of
information about P0 and alpha for PUSCH,
information about closed power control loop to use,
information about modulation and coding scheme (MCS) table, and
information about MCS table for transform precoding.

3. A radio communication method for a terminal comprising:
receiving a configured grant configuration;
applying a first parameter which is a part of the configured grant configuration, to a retransmission of a physical uplink shared channel (PUSCH) based on the configured grant configuration; and
receiving a physical downlink control channel (PDCCH) with a cyclic redundancy check (CRC) scrambled by a configured scheduling radio network temporary identifier (CS-RNTI), which indicates the retransmission,
wherein the configured grant configuration is applied to a configured-grant-type PUSCH transmission that is configured by higher layer signaling,
wherein the terminal receives a PUSCH configuration comprising a second parameter, which includes a number of repetitions of data, and
wherein the terminal applies the second parameter to the retransmission.

4. A base station comprising:
a transmitter that transmits a configured grant configuration; and
a processor that controls reception of a retransmission of a physical uplink shared channel (PUSCH) based on the configured grant configuration,
wherein a first parameter which is a part of the configured grant configuration is applied to the retransmission,
wherein the configured grant configuration is applied to a configured-grant-type PUSCH transmission that is configured by higher layer signaling,
wherein the transmitter transmits a physical downlink control channel (PDCCH) with a cyclic redundancy check (CRC) scrambled by a configured scheduling radio network temporary identifier (CS-RNTI), which indicates the retransmission, and
wherein the transmitter transmits a PUSCH configuration comprising a second parameter, which includes a number of repetitions of data, applied to the retransmission.

5. A system comprising:
a terminal that comprises:
a receiver that receives a configured grant configuration; and
a processor that applies a first parameter which is a part of the configured grant configuration, to a retransmission of a physical uplink shared channel (PUSCH) based on the configured grant configuration; and
a base station that comprises:
a transmitter that transmits the configured grant configuration; and
a processor that controls reception of the retransmission,
wherein the configured grant configuration is applied to a configured-grant-type PUSCH transmission that is configured by higher layer signaling,
wherein the receiver receives a physical downlink control channel (PDCCH) with a cyclic redundancy check (CRC) scrambled by a configured scheduling radio network temporary identifier (CS-RNTI), which indicates the retransmission,
wherein the receiver receives a PUSCH configuration comprising a second parameter, which includes a number of repetitions of data, and
wherein the processor of the terminal applies the second parameter to the retransmission.

* * * * *